(12) United States Patent
Xiao (10) Patent No.: US 10,989,610 B2
(45) Date of Patent: Apr. 27, 2021

(54) ADJUSTABLE SPRING LOADED ADAPTER FOR TEMPERATURE SENSOR

(71) Applicant: Rosemount Inc., Shakopee, MN (US)

(72) Inventor: Yao Xiao, Beijing (CN)

(73) Assignee: Rosemount Inc., Shakopee, MN (US)

( * ) Notice: Subject to any disclaimer, the term of this patent is extended or adjusted under 35 U.S.C. 154(b) by 332 days.

(21) Appl. No.: 15/808,407

(22) Filed: Nov. 9, 2017

(65) Prior Publication Data

US 2018/0188119 A1    Jul. 5, 2018

Related U.S. Application Data

(63) Continuation of application No. PCT/CN2016/113714, filed on Dec. 30, 2016.

(51) Int. Cl.
| | |
|---|---|
| *G01K 1/14* | (2021.01) |
| *G01K 13/08* | (2006.01) |
| *G01K 1/08* | (2021.01) |
| *G01K 13/02* | (2021.01) |
| *G03G 15/20* | (2006.01) |

(52) U.S. Cl.
CPC ............ *G01K 13/08* (2013.01); *G01K 1/08* (2013.01); *G01K 1/14* (2013.01); *G01K 13/02* (2013.01); *G03G 15/205* (2013.01)

(58) Field of Classification Search
CPC ............ G01K 1/14; G01K 13/02; G01K 1/08; G01K 7/02; G01K 13/00; G01K 1/16; G01K 7/04; G01K 7/06; G01N 2001/2285; G01N 25/32
USPC ..................................................... 340/870.17
See application file for complete search history.

(56) References Cited

U.S. PATENT DOCUMENTS

| | | | |
|---|---|---|---|
| 2,733,885 A * | 2/1956 | Brown et al. .......... | G01K 1/143 248/161 |
| 2,838,935 A * | 6/1958 | Di Cecio ................ | G01K 1/14 338/28 |

(Continued)

FOREIGN PATENT DOCUMENTS

| | | |
|---|---|---|
| CN | 2039838 U | 6/1989 |
| CN | 104132741 A | 11/2014 |
| CN | 106092354 A * | 11/2016 |

OTHER PUBLICATIONS

First Office Action for Chinese Patent Application No. 201710589884.2, dated May 29, 2019, 21 pages including English translation.

(Continued)

*Primary Examiner* — Gail Kaplan Verbitsky
(74) *Attorney, Agent, or Firm* — Christopher R. Christenson; Kelly, Holt & Christenson PLLC (57) ABSTRACT

A temperature sensing assembly includes a temperature sensor having a first end and a second end and an adjustable clamping mechanism configured to adjustably couple the temperature sensor to a tube of the temperature sensing assembly. The temperature sensing assembly further includes a thermowell having a proximal and distal end, the proximal end being configured to attach to an adapter of the temperature sensing assembly and the distal end being configured to receive the second end of the temperature sensor. In addition, the adjustable clamping mechanism may be configured to fix the temperature sensor to the tube at any point along the temperature sensor.

13 Claims, 8 Drawing Sheets

(56) References Cited

U.S. PATENT DOCUMENTS

| | | | | | |
|---|---|---|---|---|---|
| 2,875,614 | A * | 3/1959 | Dobrin | | G01K 1/08 |
| | | | | | 374/203 |
| 3,531,993 | A * | 10/1970 | Karn | | G01K 1/14 |
| | | | | | 136/230 |
| 3,753,787 | A * | 8/1973 | Webb | | G01K 1/14 |
| | | | | | 136/221 |
| 4,355,912 | A * | 10/1982 | Haak | | G01K 1/14 |
| | | | | | 374/208 |
| 4,444,990 | A * | 4/1984 | Villar | | G01K 7/04 |
| | | | | | 136/221 |
| 4,454,370 | A * | 6/1984 | Voznick | | G01K 7/04 |
| | | | | | 136/221 |
| 4,830,515 | A * | 5/1989 | Cortes | | G01K 1/14 |
| | | | | | 136/221 |
| 4,963,194 | A * | 10/1990 | Mele | | G01K 1/14 |
| | | | | | 136/221 |
| 5,404,760 | A * | 4/1995 | Robinson | | G01K 13/02 |
| | | | | | 73/863.11 |
| 5,674,009 | A * | 10/1997 | Stark | | G01K 1/08 |
| | | | | | 136/230 |
| 6,220,749 | B1 * | 4/2001 | Wyker | | F16C 19/525 |
| | | | | | 374/141 |
| 6,231,230 | B1 * | 5/2001 | Baldock | | G01K 1/146 |
| | | | | | 374/179 |
| 6,461,037 | B1 * | 10/2002 | O'Leary | | G01K 1/083 |
| | | | | | 374/158 |
| 7,465,086 | B1 * | 12/2008 | Foreman, Jr. | | G01K 1/08 |
| | | | | | 136/200 |
| 8,220,346 | B2 * | 7/2012 | Arzberger | | B22D 2/006 |
| | | | | | 73/866.5 |
| 9,341,522 | B2 * | 5/2016 | Kitzman | | G01K 1/08 |
| 9,557,225 | B2 * | 1/2017 | Daily | | G01K 1/143 |
| 10,302,507 | B2 * | 5/2019 | Noguchi | | G01K 7/22 |
| 10,428,716 | B2 * | 10/2019 | Chenelle | | G01K 1/12 |
| 10,697,835 | B2 * | 6/2020 | Sozzi | | G01M 13/04 |
| 2008/0137713 | A1 * | 6/2008 | Gosis | | G01K 1/146 |
| | | | | | 374/208 |
| 2010/0037689 | A1 * | 2/2010 | Arzberger | | G01K 1/14 |
| | | | | | 73/295 |
| 2013/0163637 | A1 * | 6/2013 | Parsons | | G01K 13/02 |
| | | | | | 374/179 |
| 2014/0105248 | A1 * | 4/2014 | Daily | | G01K 1/14 |
| | | | | | 374/179 |
| 2015/0068281 | A1 * | 3/2015 | Lyon | | G01N 25/00 |
| | | | | | 73/25.01 |
| 2015/0185093 | A1 * | 7/2015 | Kitzman | | G01K 1/08 |
| | | | | | 73/862.381 |
| 2017/0227406 | A1 * | 8/2017 | Noguchi | | G01K 7/22 |
| 2018/0003566 | A1 * | 1/2018 | Saillard | | G01K 7/06 |
| 2019/0101453 | A1 * | 4/2019 | Foreman, Jr. | | G01K 7/02 |
| 2020/0173947 | A1 * | 6/2020 | Schilling | | G01N 15/0656 |

OTHER PUBLICATIONS

International Search Report and Written Opinion, for International Patent Application No. PCT/CN2016/113714, dated Sep. 21, 2017, 12 pages.

Second Office Action for Chinese Patent Application No. 201710589884.2, dated Dec. 4, 2019. 18 pages.

Rejection Decision for Chinese Patent Application No. 201710589884.2, dated Mar. 27, 2020 19 pages including English translation.

Japanese Office Action dated Sep. 1, 2020 for Japanese Patent Application No. 2019-535902, 11 pages including English translation.

Extended Europear Search Report dated Jul. 17, 2020 for European Application No. 16025522.1, 7 pages.

* cited by examiner

FIG. 1

PRIOR ART

ADJUSTABLE SPRING LOADED ADAPTER FOR TEMPERATURE SENSOR

BACKGROUND

The present disclosure relates generally to temperature sensing assemblies for use with industrial processes. In particular, this disclosure relates to temperature sensors for use with thermowells.

Industrial process temperature sensing apparatuses may be used to sense a temperature of fluid flowing through a conduit or contained within a vessel. A temperature sensing apparatus includes a temperature sensor and may also include a protective container. The temperature sensor may have a temperature sensing device at or near a sensor tip and, if inserted into a protective container, may come into contact with a base of the protective container. The protective container is designed to be, in physical contact with the fluid to protect the temperature sensor within the protective container from physical or chemical damage from the fluid (e.g., impacts, corrosion, etc.), while efficiently conducting heat between the fluid and the temperature sensor tip. However, a lack of physical contact between the sensor tip and the base of the protective container may reduce the conduction efficiency, resulting in a slow response speed by the temperature sensor to changes in fluid temperature, and may also introduce an error in a temperature reading.

SUMMARY

A temperature sensing assembly includes a temperature sensor having a first end and a second end and an adjustable clamping mechanism configured to adjustably couple the temperature sensor to a tube of the temperature sensing assembly. The temperature sensing assembly further includes a thermowell having a proximal and distal end the proximal end being configured to attach to an adapter of the temperature sensing assembly and the distal end being configured to receive the second end of the temperature sensor. In addition, the adjustable clamping mechanism may be configured to fix the temperature sensor to the tube at any point along the temperature sensor.

BRIEF DESCRIPTION OF THE DRAWINGS

Shows an exemplary temperature sensor environment with which embodiments of the present invention are particularly useful.

DETAILED DESCRIPTION OF ILLUSTRATIVE EMBODIMENTS

Figure 1:
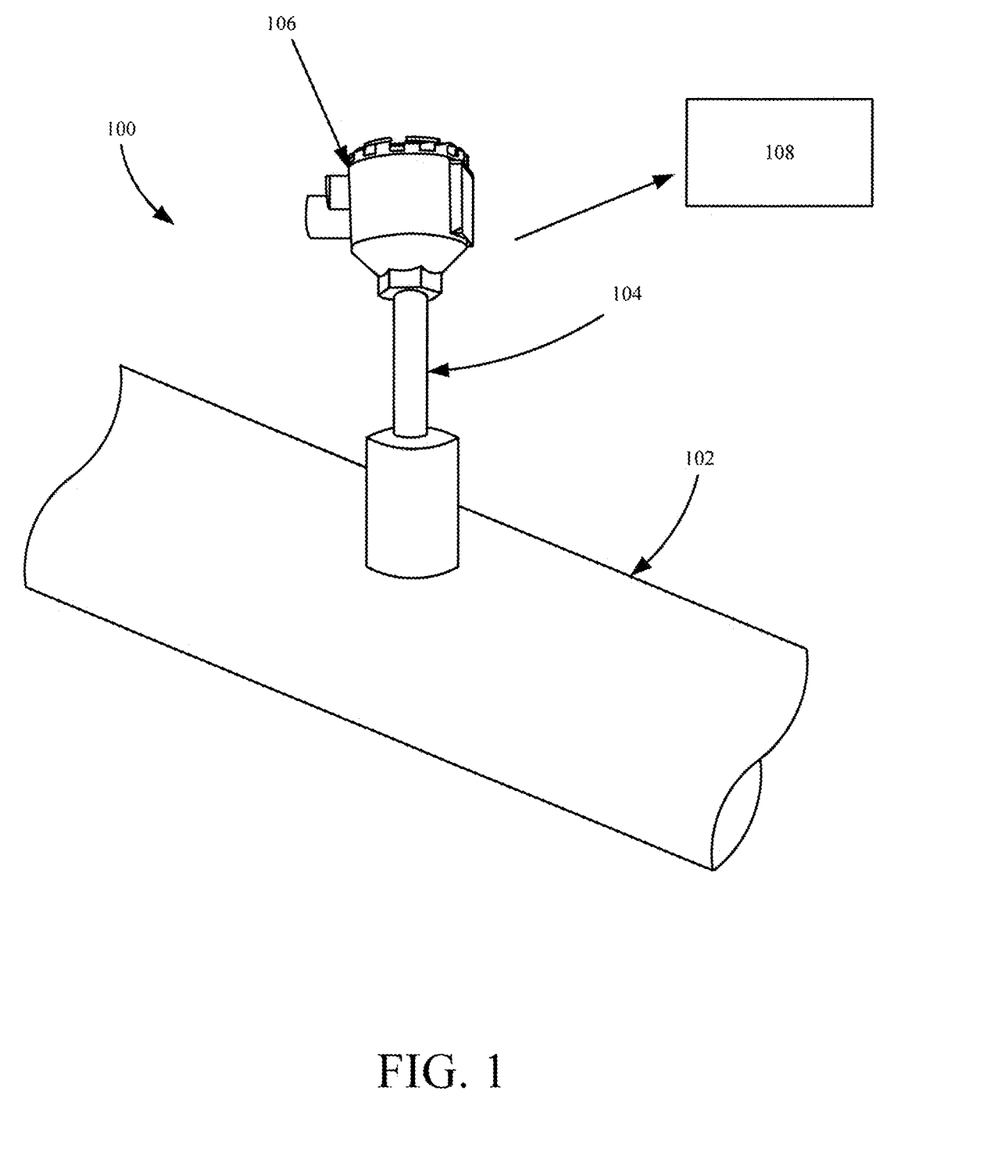

FIG. 1 shows an exemplary temperature sensor environment with which embodiments of the present invention are particularly useful. Temperature sensor environment 100 illustratively includes pipe 102, thermowell 104, temperature sensor (hidden within thermowell 104), transmitter 106 and control element 108. Temperature measurements may be transmitted from transmitter 106 to control element 108. Although embodiments of the present invention are shown with pipe 102, embodiments of the present invention may be practiced on any container, pipe or storage unit that utilizes a temperature sensing assembly.

An industrial temperature sensor may be used to measure the temperature of a process sample. A temperature sensor can include resistance temperature detectors (RTDs), thermocouples, or any other sensor mechanism. When environments are harsh, the temperature sensor will be installed into thermowell 104. This ensures that the temperature sensor (hidden within thermowell 104) will be protected from the surrounding environment. However, in order to provide accurate temperature readings, the temperature sensor (hidden within thermowell 104) must remain in contact within a distal portion of thermowell 104.

Normally, the temperature sensor will be Maintained in a fixed position with a spring-loaded fitting. This allows the tip of a temperature sensor to remain biased into the bottom of a thermowell. However, once the temperature sensor becomes fixed to the spring-loaded fitting, the fixed position cannot be adjusted. This is not ideal. If the temperature sensor breaks, for example, both the temperature sensor and the spring loaded fitting will require replacement as a single unit.

Figure 2:
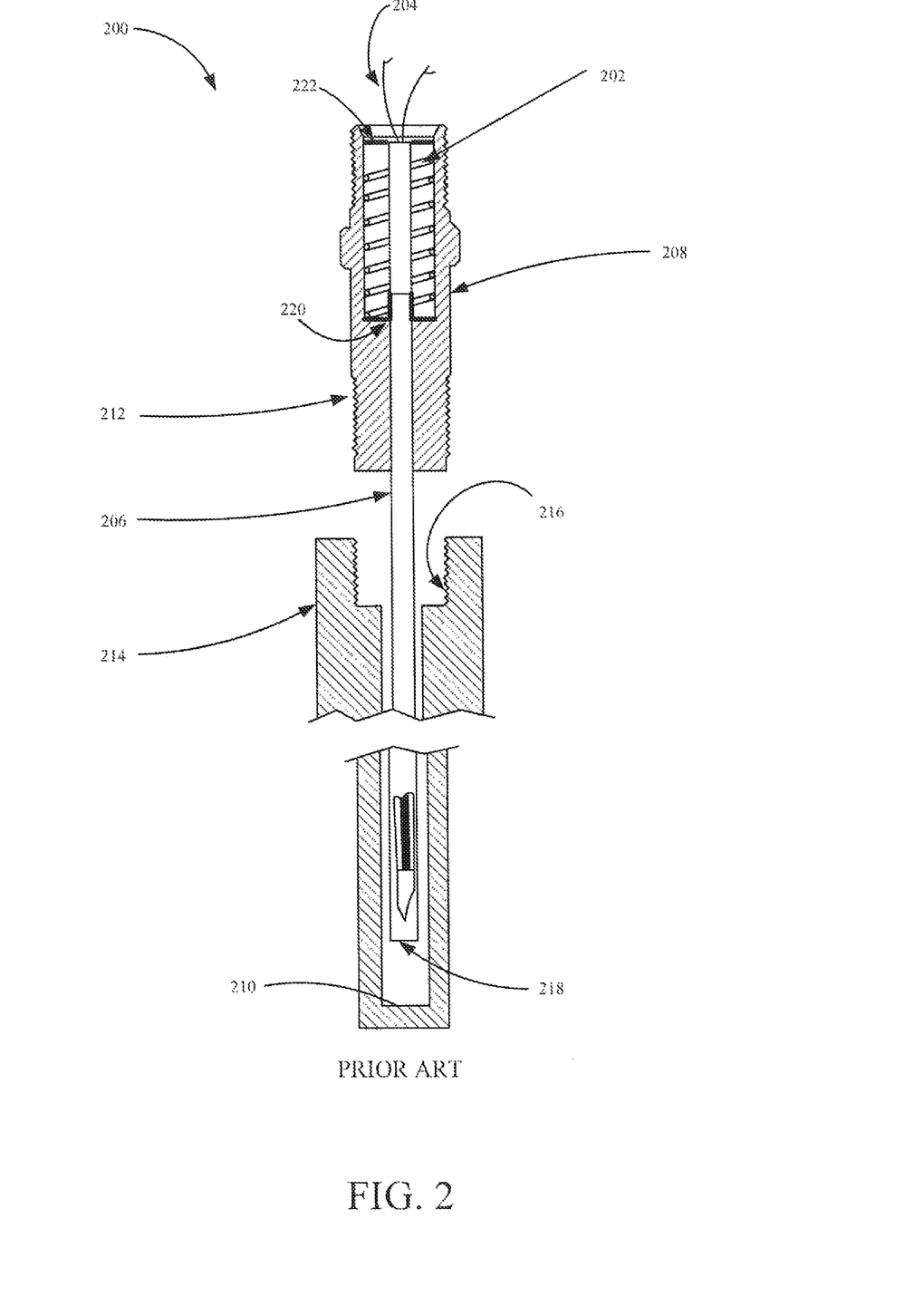
FIG. 2 is a diagrammatic view of a temperature sensing apparatus.

FIG. 2 is a diagrammatic view of a temperature sensing apparatus. Temperature sensing apparatus 200 includes connector 208, thermowell 214, sensor 206 and spring 202. Spring 202 is disposed between spring stop 220 and snap ring 222. Spring stop 220 is illustratively crimped on sensor 206. Spring 202 is then placed on spring stop 220 and around sensor 206. Snap ring 222 is then crimped into connector 208 such that spring 202 cannot be removed from connector 208. This fixes sensor 206 to connector 208. In this configuration, the fixed position of sensor 206 cannot be changed, and if sensor 206 were to break, connector 208 would have to be thrown away.

In operation, spring 202 is configured to produce a biasing force against sensor 206. As sensor 206 is inserted into the distal portion 210 of thermowell 214, connector threads 212 engage internal threads 216 of thermowell 214. As connector 208 is threaded, spring 202 is compressed and exerts a biasing force against sensor 206. This biasing force allows for bottom 218 of sensor 206 to remain in the distal portion 210 of thermowell 214. Sensor 206 also includes leads 204 that may connect to a transmitter.

Figure 3:
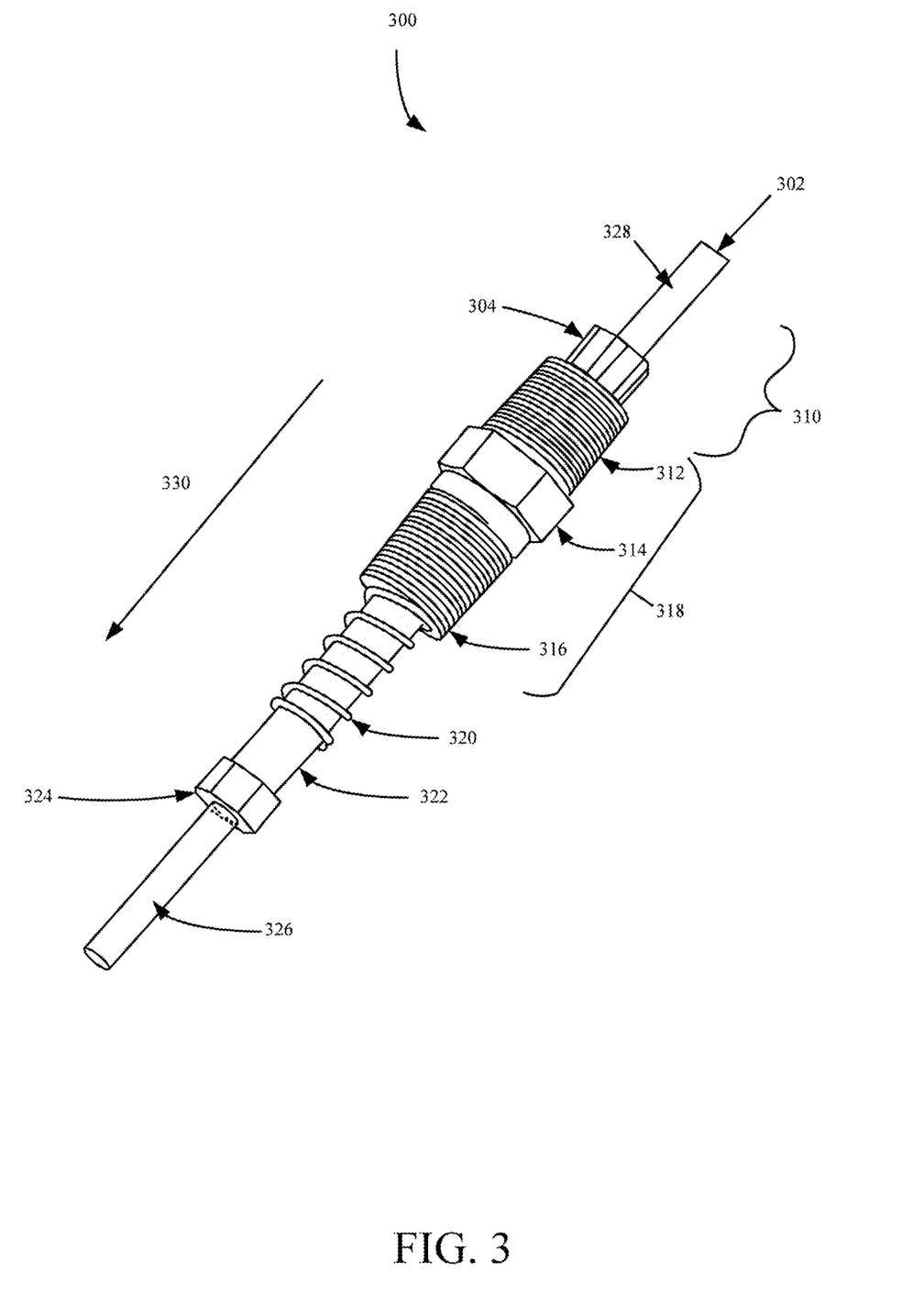
FIG. 3 is a diagrammatic view of an improved temperature sensing assembly in accordance with an embodiment of the present invention.
Figure 4:
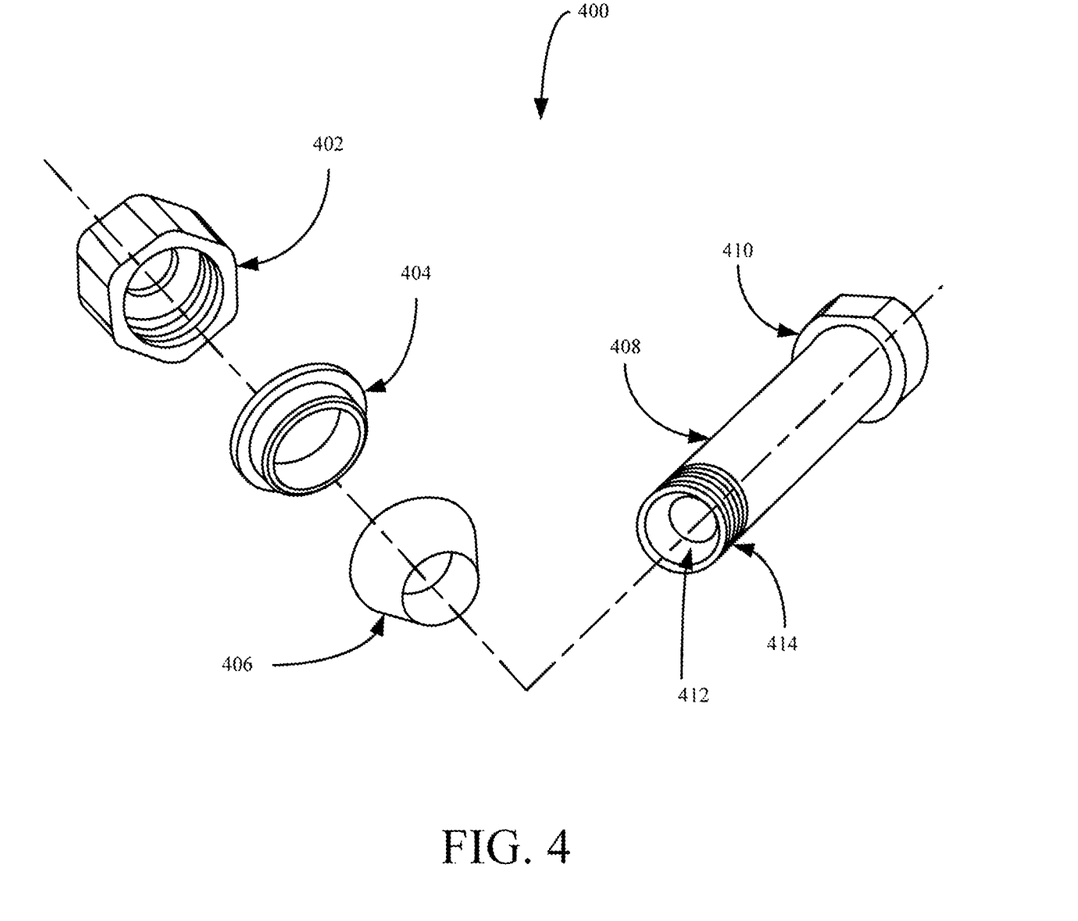
FIG. 4 is a diagrammatic view of an adjustable clamping mechanism in accordance with an embodiment of the present invention.

FIG. 3 is a diagrammatic view of an improved temperature sensing assembly in accordance with an embodiment of the present invention. Temperature sensing assembly 300 includes temperature sensor 302, adjustable clamping mechanism 310, tube 322, adapter 318 and compression mechanism 320. Tube 322 may be cylindrical and includes a threaded portion (e.g. threaded portion 414 as shown in FIG. 4) and a raised end portion 324. In one embodiment, raised end portion 324 may include flat portions configured to be wrenched. Temperature sensor 302 includes a first end 328 and a second end 326.

In accordance with an embodiment of the present invention, adjustable clamping mechanism 310 comprises front ferrule, back ferrule, and nut 304. The ferrules are shown in FIG. 4. In one embodiment, adjustable clamping mechanism 310 is configured to secure temperature sensor 302 to a tube 322 of temperature sensing assembly 300. The point at which temperature sensor 302 is attached to tube 322 may be adjusted to any point along temperature sensor 302.

In operation, temperature sensor 302 may be inserted into the holes of tube 322, front ferrule, back ferrule and nut 304. Nut 304 may then be received and tightened at a threaded portion (e.g. threaded portion 414 as shown in FIG. 4) of tube 322, thereby attaching temperature sensor 302 with tube 322. However, the position at which the temperature sensor 302 is attached to tube 322 can vary, as the nut 304 may be loosened and temperature sensor 302 moved within tube 122.

Adapter 318 illustratively includes a first threaded end 312, a second threaded end 316, and a flat edged portion 314. In one embodiment, first threaded end 312 can connect to a housing device and second threaded end 316 can connect to a thermowell. In one embodiment, the flat edged portion 314 may be used to tighten the adapter 318 to a thermowell or a housing device.

Compression mechanism 320 is illustratively set onto tube 322 and is disposed between raised end portion 324 and a first threaded end 312 of adapter 318. When compressed between raised end portion 324 and a first threaded end 312 of adapter 318, compression mechanism 320 produces a biasing force, in the direction generally indicated by arrow 330, against tube 322 and temperature sensor 302. This allows second end 326 of temperature sensor 302 to remain in a distal end of a thermowell. In one embodiment, compression mechanism 320 includes a spring.

In operation, temperature sensor 302 may be adjustably attached to tube 322 using adjustable clamping mechanism 310. The second threaded end 316 of adapter 318 is then fastened to a threaded portion of a thermowell. This fastening compresses compression mechanism 320 between raised end portion 324 and a first threaded end 312 of adapter 318. This compression generates a biasing force 330 against tube 322 and temperature sensor 322 such that temperature sensor 322 remains in contact with a distal portion of a thermowell.

FIG. 4 is a diagrammatic view of an adjustable clamping mechanism in accordance with an embodiment of the present invention. Adjustable clamping mechanism 400 includes nut 402, back ferrule 404 and front ferrule 406. In one embodiment, adjustable clamping mechanism 400 is configured to secure a temperature sensor to a tube 408 of a temperature sensing assembly. Tube 408 includes threaded portion 414, conical recess 412 and raised end portion 410.

A temperature sensor may be inserted into the holes of tube 408, front ferrule 406, back ferrule 404 and nut 402. Front ferrule 406 is then held within a conical recess 412 of tube 408 as a temperature sensor is inserted into a tube 408. Nut 402 may then be received and tightened at a threaded portion 414 of tube 408, thereby attaching a temperature sensor to a tube 408 of a temperature sensing assembly. In addition, the position at which a temperature sensor becomes attached to a tube 408 of a temperature sensing assembly can vary.

Figure 5:
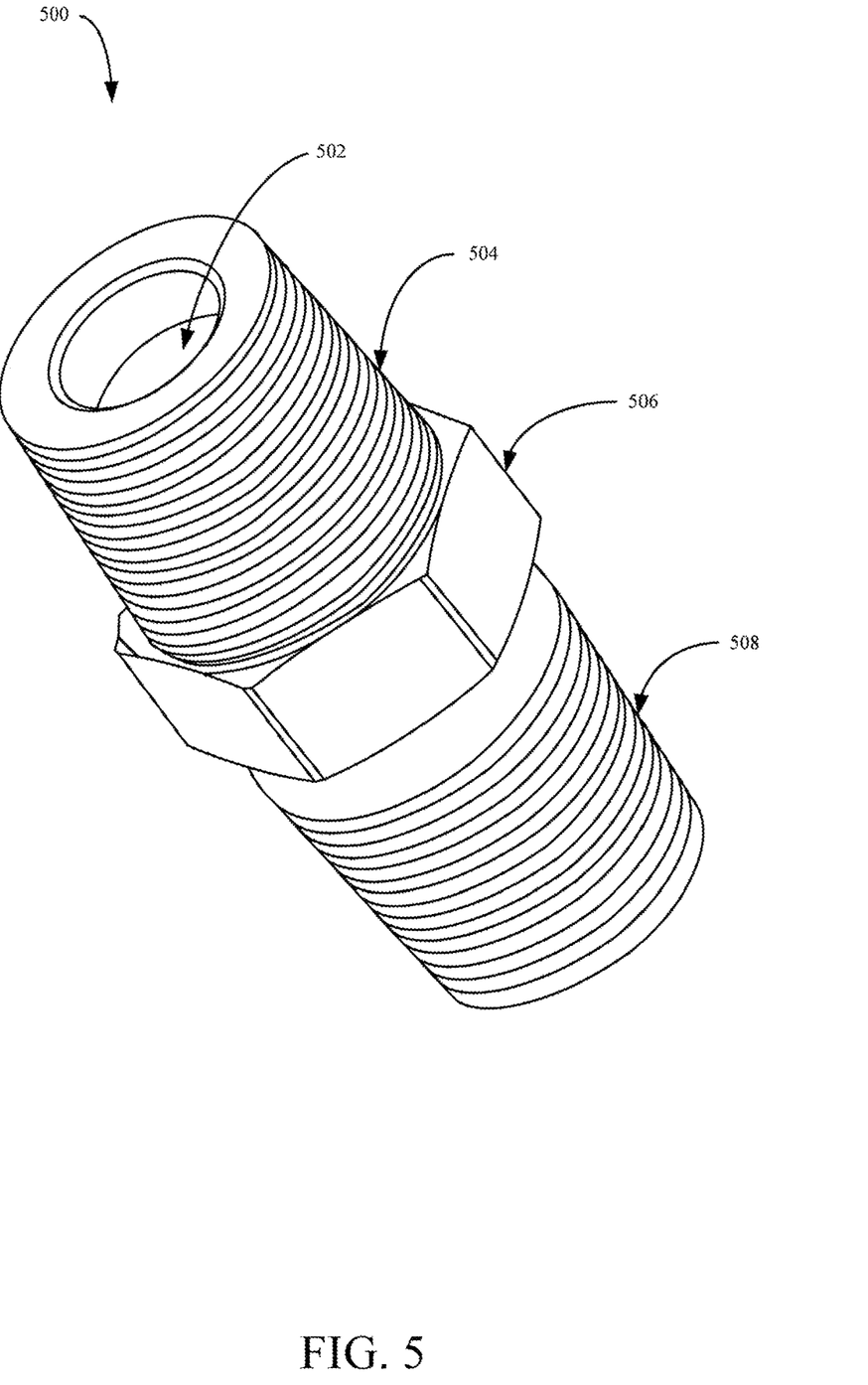
FIG. 5 is a diagrammatic view of an adapter in accordance with an embodiment of the present invention.

FIG. 5 is a diagrammatic view of an adapter in accordance with an embodiment the present invention. Adapter 500 includes first threaded end 504, flat edged portion 506, second threaded end 508 and central opening 502. Central opening 502 extends along adapter 500 and, in one embodiment, is configured to receive a tube and a compression mechanism. In one embodiment, first threaded end 504 has an outer diameter that is more narrow relative to an outer diameter of second threaded end 508. This ensures that a nut (e.g. nut 402 as shown in FIG. 4) cannot enter into adapter 500 from a first threaded end 504. Additionally, this also prevents a compression mechanism from exiting a first threaded end 504 of an adapter 500 upon entering the adapter 500 through a second threaded end 508.

In operation, adapter 500 may fully enclose a compression mechanism such that the compression mechanism compresses within adapter 500 between a first threaded end 504 and a raised end portion of a tube (e.g. raised end portion 324 as shown in FIG. 3). In one embodiment, as the second threaded end 508 is threaded into a thermowell the compression mechanism may compress between a first threaded end 504 and a raised end portion of a tube (e.g. raised end portion 324 as shown in FIG. 3), such that a biasing force is generated. In another embodiment, first threaded end 504 is configured to be threaded into a housing device. The attachment of the second threaded end 508 into a thermowell or the first threaded end 504 into a housing device may be facilitated by wrenching flat edged portion 506.

Figure 6:
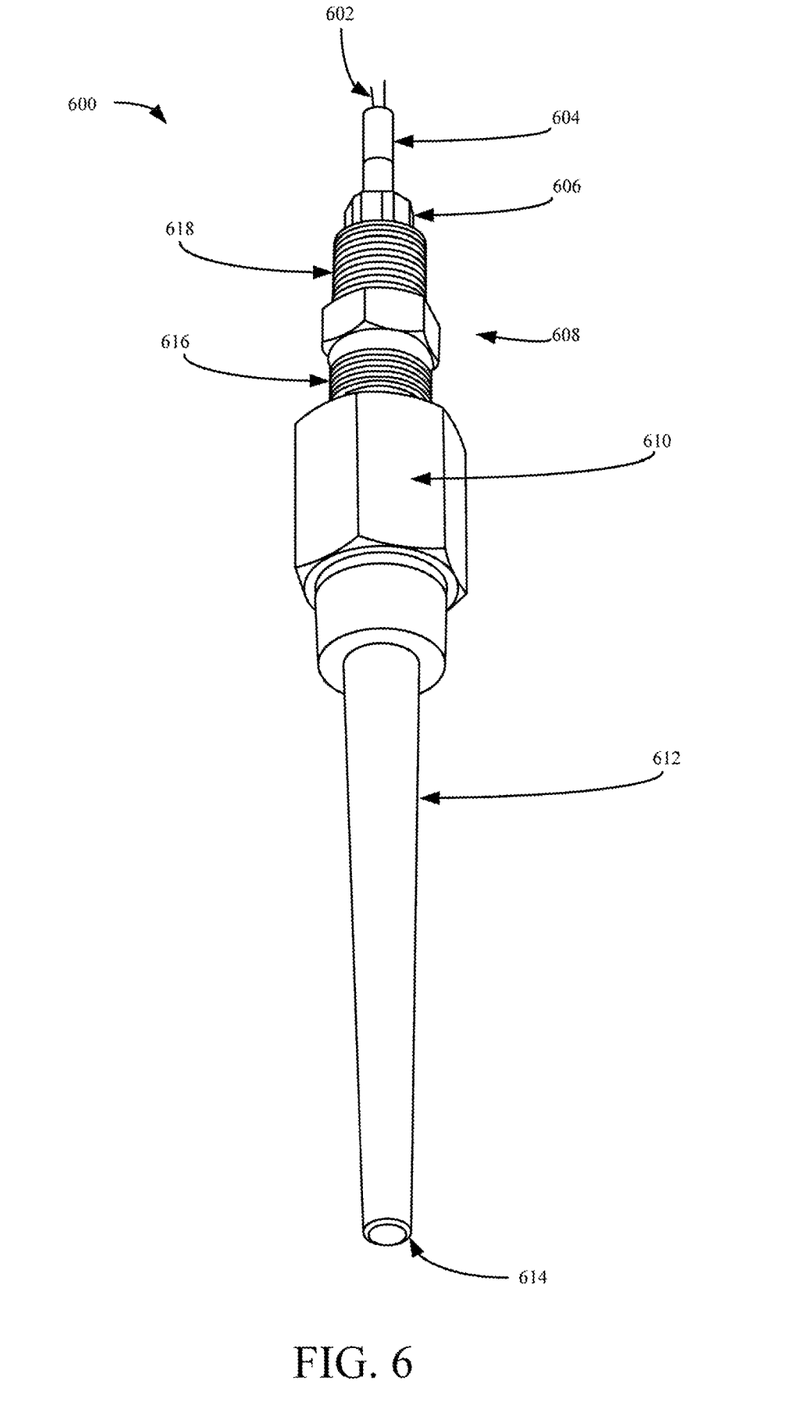
FIG. 6 is a diagrammatic view of an improved temperature sensing assembly that includes a thermowell in accordance with an embodiment of the present invention.

FIG. 6 is a diagrammatic view of a temperature sensing, assembly that includes a thermowell in accordance with an embodiment of the present invention. Temperature sensing assembly 600 includes to sensor 604, adjustable clamping mechanism 606, adapter 608 and thermowell 612. In accordance with an embodiment of the present invention, temperature sensing assembly 600 may also include any or all of the features set forth in FIG. 3. For example, a compression mechanism (e.g. compression mechanism 320 as shown in FIG. 3) and a tube (e.g. tube 322 as shown in FIG. 3).

Thermowell 612 includes a proximal end 610 and distal end 614. Adapter 608 includes a first threaded end 618 and a second threaded end 616. Second threaded end 616 is fastened to proximal end 610 of thermowell 612. In accordance with an embodiment of the present invention, temperature sensor 604 may be adjustably attached to a tube using adjustable clamping mechanism 606. Temperature sensor 604 may also include leads 602 that connect to a transmitter.

Figure 7:
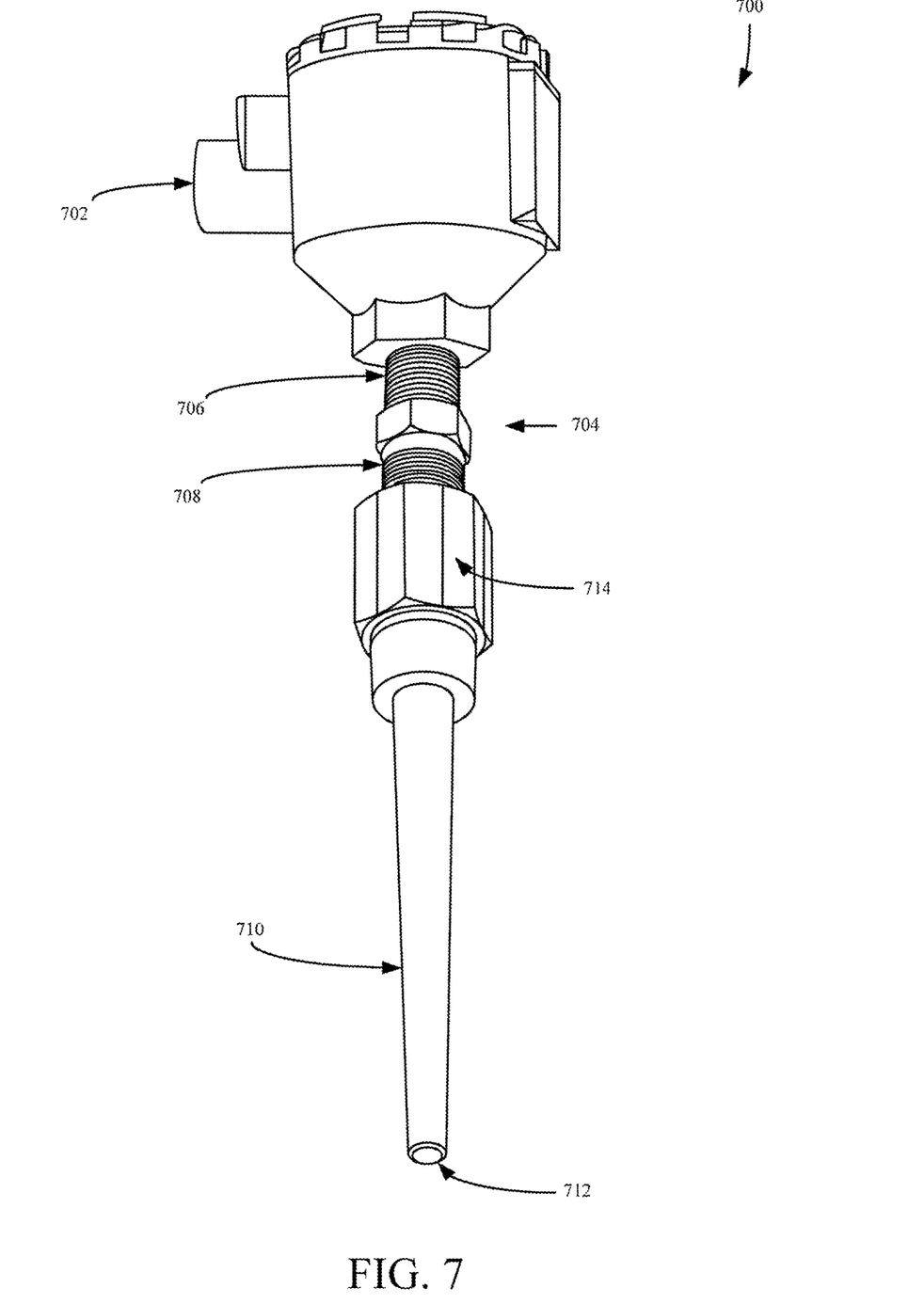
FIG. 7 is a diagrammatic view of an improved temperature sensing assembly that includes a thermowell and a housing device in accordance with an embodiment of the present invention.

FIG. 7 is a diagrammatic view of a temperature sensing assembly that includes a thermowell and housing device in accordance with an embodiment of the present invention. Temperature sensing assembly 700 includes housing device 702, adaptor 704, thermowell 710 and a temperature sensor (not shown, within thermowell 710, adapter 704 and housing device 702). In accordance with an embodiment of the present invention, temperature sensing assembly 700 may also include any or all of the features sot forth in FIG. 3. For example, an adjustable clamping mechanism (e.g. adjustable clamping mechanism 310 as shown in FIG. 3), a compression mechanism (e.g. compression mechanism 320 as shown in FIG. 3), and a tube (e.g. tube 322 as shown in FIG. 3). Thermowell 710 illustratively includes proximal end 714 and distal end 712.

In accordance with an embodiment of the present invention, adapter 704 includes a first threaded end 706 attached to housing device 702 and a second threaded end 708 attached to a proximal end 714 of thermowell 710.

Although embodiments of the present invention are used with a thermowell having a particular length, it is expressly contemplated that a number of different thermowells may be used depending on the particular environment. In addition to thermowells, embodiments described herein may be useful in providing an adjustable temperature sensing assembly with a tube or other container that holds a substance (e.g, liquid, gas, etc.) for measurement.

Figure 8:
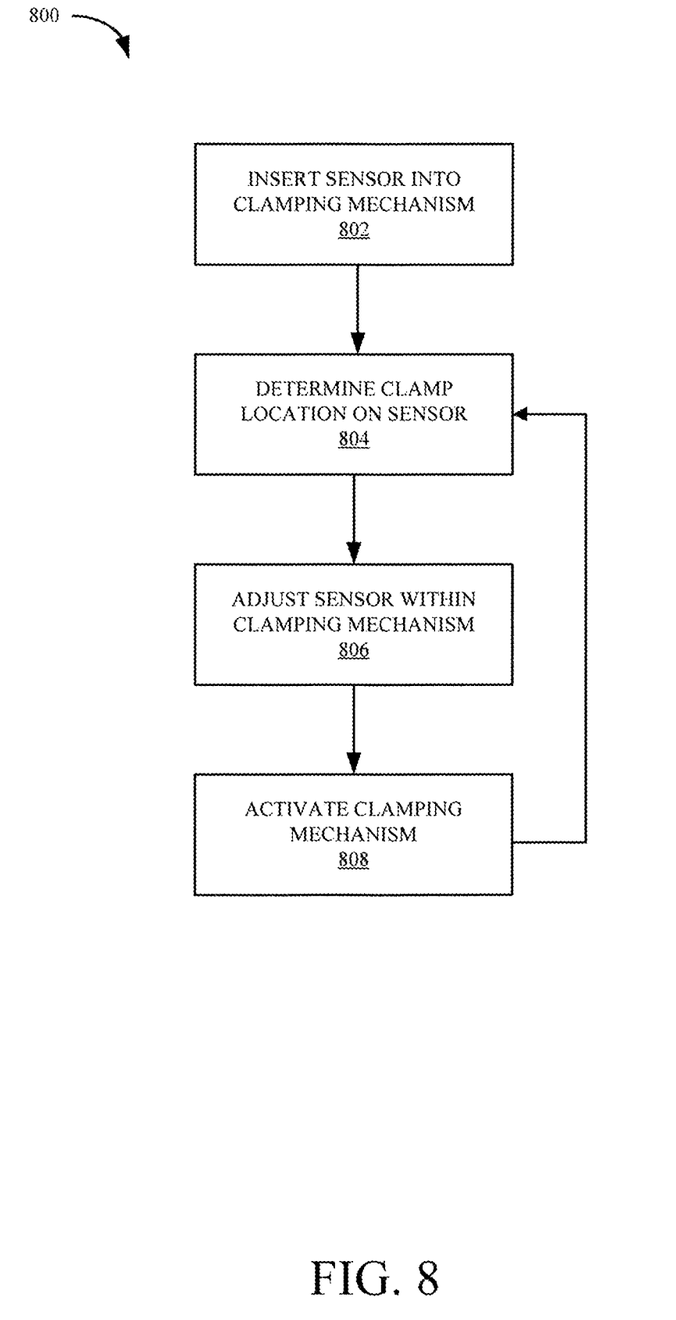
FIG. 8 is a flow diagram of a method of adjustably attaching a sensor to a temperature sensing assembly in accordance with an embodiment of the present invention.

FIG. 8 is a flow diagram of a method of adjustably attaching a sensor to a temperature sensing assembly in accordance with an embodiment of the present invention. At block 802, a sensor is inserted into a clamping mechanism. In one embodiment, a clamping mechanism may include a nut, ferrule, and a tube. As the sensor is inserted into the clamping mechanism, the sensor may extend completely through the tube. Additionally, a front ferrule may come into contact with a conical recess located with the tube and hold the ferrule in place. At block 804, a clamp location on the sensor is determined. In accordance with an embodiment of the present invention, the clamp location can be any position along the sensor. At block 806, the sensor is adjusted within the clamping mechanism based on the determined clamping location. In one embodiment, adjusting the clamping mechanism may include sliding the sensor within the tube to a desired clamping location. At block 808, the clamping mechanism is activated to adjustably attach the sensor along the clamp location, in one embodiment, activating the clamping mechanism may include fastening a nut to a threaded end of a tube such that a front and back ferrule may grip a sensor. However, if a different clamping location on the sensor is desired, blocks 804-808 may be repeated.

Although the present invention has been described with reference to preferred embodiments, workers skilled in the art will recognize that changes may be made in form and detail without departing from the spirit and scope of the invention.

What is claimed is:

1. A temperature sensing assembly comprising:
    a temperature sensor having a cylindrical sidewall;
    an adjustable clamping mechanism encircling the cylindrical sidewall of the temperature sensor, the adjustable clamping mechanism including,
        a tube sized to receive the temperature sensor having the cylindrical sidewall,
        a nut configured to threadably engage the tube,
        a stepped ferrule contacting the nut,
        a tapered ferrule contacting the stepped ferrule, the tapered ferrule being configured to apply a clamping force to the cylindrical sidewall of the temperature sensor to fix the cylindrical sidewall to the adjustable clamping mechanism;
    an adapter disposed about the tube of the adjustable clamping mechanism, the adapter having an externally threaded region;
    a compression mechanism disposed about the adjustable clamping mechanism and configured to generate a biasing force between the adapter and the adjustable clamping mechanism;
    a thermowell having a proximal end and a distal end, the proximal end being configured to attach to the externally threaded region of the adapter, and the distal end being configured to receive an end of the temperature sensor.

2. The temperature sensing assembly of claim 1, wherein the adapter comprises a second threaded end.

3. The temperature sensing assembly of claim 1, wherein the adjustable clamping mechanism includes a tube having a raised end portion and a threaded portion.

4. The temperature sensing assembly of claim 3, wherein the tube further comprises a recess configured to house the tapered ferrule.

5. The temperature sensing assembly of claim 2, wherein the first threaded end is configured to attach to a housing device and wherein the second threaded end is configured to attach to the thermowell.

6. A temperature sensing assembly comprising:
    a temperature sensor;
    an adjustable clamping mechanism including,
        a tube sized to receive the temperature sensor,
        a nut configured to threadably engage the tube,
        a stepped ferrule contacting the nut,
        a tapered ferrule contacting the stepped ferrule, the tapered ferrule configured to couple to the temperature sensor and the tube, to apply a clamping, force to the temperature sensor to fix the adjustable clamping mechanism to the temperature sensor;
    an adapter disposed around the tube of the adjustable clamping mechanism, the adapter having a threaded end that is configured to threadably engaged a thermowell;
    a compression mechanism configured to generate a biasing force between the adjustable clamping mechanism and the adapter.

7. The temperature sensing, assembly of claim 6, wherein the compression mechanism is enclosed within the adapter.

8. The temperature sensing assembly of claim 6, Therein the adapter comprises a first threaded end and a second threaded end.

9. The temperature sensing assembly of claim 6, wherein the temperature sensor is a thermocouple.

10. The temperature sensing assembly of claim 6, wherein the compression mechanism is a spring.

11. The temperature sensing assembly of claim 6, wherein the temperature sensor is a resistance temperature detector.

12. The temperature sensing assembly of claim 6, wherein the tube further includes a recess configured to house the tapered ferrule.

13. The temperature sensing assembly of claim 8, wherein the first threaded end has an outer diameter that is smaller than an outer diameter of the second threaded end.

\* \* \* \* \*